United States Patent [19]
McKim

[11] Patent Number: 5,292,040
[45] Date of Patent: Mar. 8, 1994

[54] APPARATUS FOR APPLYING SEAMLESS FLOORING MATERIAL

[75] Inventor: Alan M. McKim, Oakville, Canada

[73] Assignee: Leemac Industries, Inc., Melrose Park, Ill.

[21] Appl. No.: 851,727

[22] Filed: Mar. 17, 1992

[51] Int. Cl.$^5$ .................................. A01C 15/04
[52] U.S. Cl. .......................... 222/612; 404/118
[58] Field of Search .............. 222/160, 610, 611.1, 222/611.2, 612; 404/101, 108, 110, 106, 118; 401/5, 48

[56] References Cited

U.S. PATENT DOCUMENTS

| | | | |
|---|---|---|---|
| 2,829,896 | 4/1958 | Swenson | 222/612 X |
| 2,950,660 | 8/1960 | Standfuss | 404/108 |
| 3,456,566 | 7/1969 | Lazaro | 404/108 |
| 3,588,155 | 6/1971 | Hirt | 222/612 X |
| 3,884,395 | 5/1975 | Keenan | 222/612 X |
| 4,496,265 | 1/1985 | Fragale | 404/118 X |
| 4,571,119 | 2/1986 | Jones et al. | 404/118 X |

Primary Examiner—Andres Kashnikow
Assistant Examiner—Kenneth DeRosa
Attorney, Agent, or Firm—Jones, Day, Reavis & Pogue

[57] ABSTRACT

An applicator for applying seamless flooring material is disclosed. The preferred embodiment includes a chassis steerably mounted on wheels. A hydraulic pump pumps fluid in series through hydraulic motors on the wheels to provide propulsion. A dispensing hopper is supported at the rear end of the chassis with the height of the hopper adjustable on each side. The applicator is part of a seamless flooring material application system, which additionally includes a forklift liftable dumpster, top-fillable with flooring material from mixing apparatus and positionable above the dispensing hopper of the applicator, and bottom-openable to dump the flooring material into the applicator hopper.

10 Claims, 7 Drawing Sheets

APPARATUS FOR APPLYING SEAMLESS FLOORING MATERIAL

BACKGROUND OF THE INVENTION

1. Field of the Invention

This invention relates to apparatus for the application of seamless flooring materials.

A typical seamless floor is an epoxy overlay, mixed with aggregate, and screeded onto a subfloor, typically concrete. Such flooring is commonly used in industrial sites and the like.

2. Description of the Prior Art

Conventionally, manual equipment has been used to apply the flooring material. Such manual equipment includes hand-pulled dollies having open-bottomed rectangular hoppers through which the material is dispensed. Typically the flooring material is simply dumped into the hopper from a wheelbarrow or a pail. Such manual equipment is inefficient to operate, however, and is not sufficiently sophisticated to provide an even, consistent application of the flooring material without undue labor input.

Once the material is on the floor, in both the prior art and the present invention, it is compacted and finished by, for example, a hand trowel or power trowel. However, both for quality and efficiency, it is highly desirable to have the initial application be as smooth and even as possible.

The invention addresses the problem of efficiently and effectively applying the flooring material to the subfloor. In the prior art, this can be quite a labour intensive process. The present invention greatly reduces the manpower requirements.

SUMMARY OF THE INVENTION

It is an object of the invention to provide apparatus for the efficient and effective application of seamless flooring materials. In accordance with one aspect of the present invention an applicator for applying seamless flooring material comprises a steerable chassis mounted on wheels, a dispensing hopper supported at the rear end of the chassis, and propulsion means to propel the applicator. The height of each side of the hopper bottom opening above the floor is separately adjustable. The hopper preferably is readily removable from the chassis.

In accordance with another aspect of the invention, a seamless flooring material application system is provided, including the applicator of the invention, in combination with a forklift liftable dumpster, top-fillable with flooring material from mixing apparatus and positionable above the dispensing hopper of the applicator, and bottom-openable to dump the flooring material into the applicator hopper.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The overall system used in conjunction with the present invention comprises the following main components:

a. a conventional mixer 4, to mix the flooring material;

b. a dumpster 2, adapted to be carried by a forklift, to receive the flooring material from the mixer and carry it to the location of the applicator; and c. the applicator 40 of the present invention, including a hopper 12 to receive the flooring material from the dumpster.

These components, acting together, provide an extremely efficient way of mixing the flooring material at a central location and delivering it to the work site for application. The improved efficiency arises not only by virtue of the applicator of the invention, but also by virtue of the improved material handling using the dumpster and a forklift. While provision is included to load the applicator from a wheelbarrow, the use of the dumpster and forklift is preferable.

Figure 1:
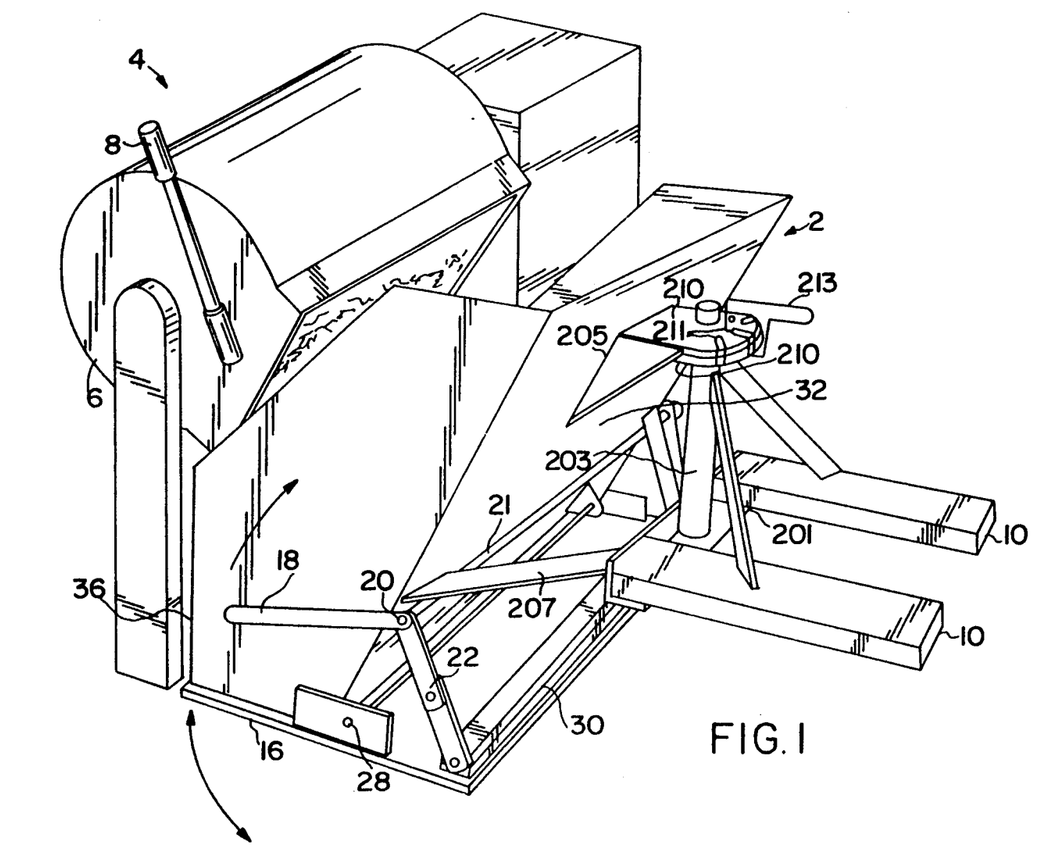
FIG. 1 is a perspective showing the dumpster and a conventional mixer.
Figure 2:
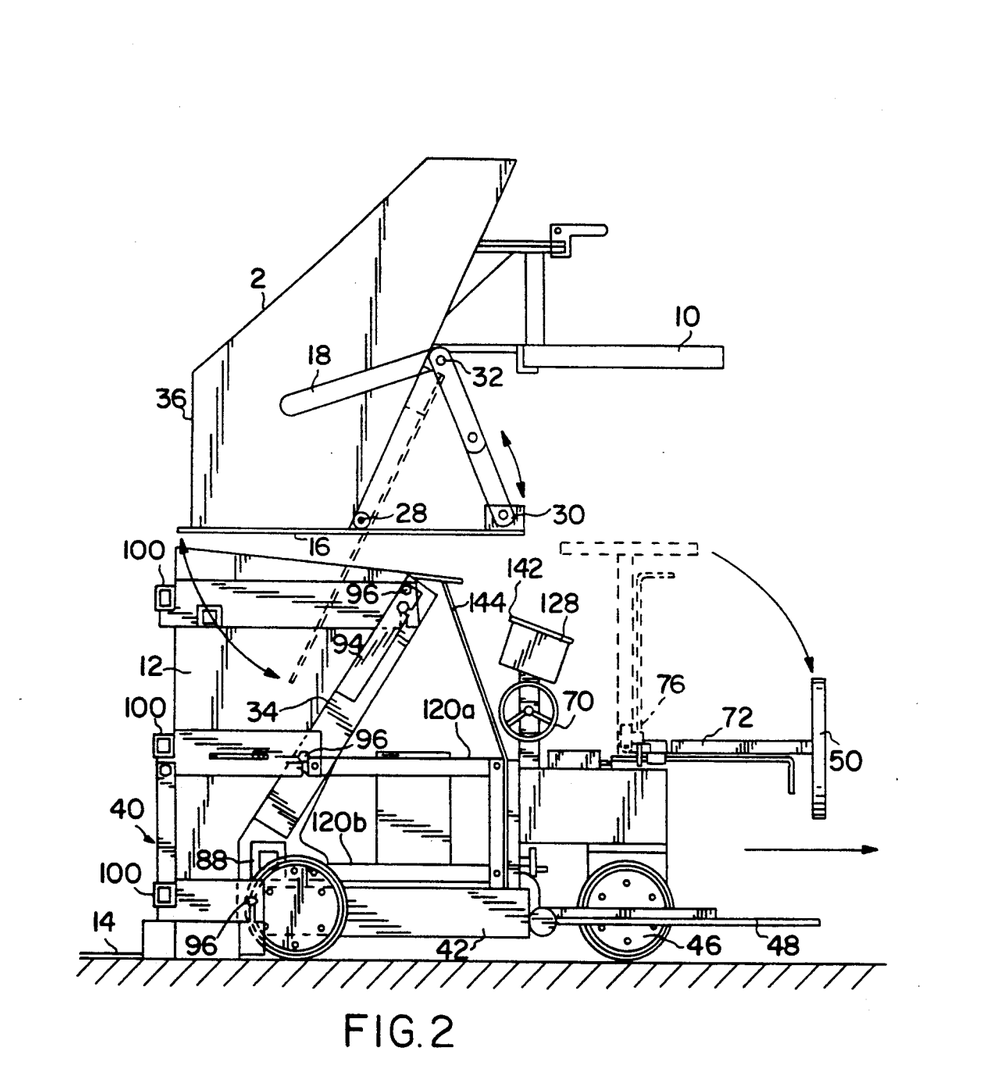
FIG. 2 is a side view showing the dumpster positioned above the hopper of the applicator.

The dumpster 2 is illustrated in FIGS. 1 and 2. It receives the flooring material from a conventional mixer 4, illustrated schematically. The mixer includes a mixing chamber 6, tippable via the handle 8 to dump the mixed flooring material into the dumpster. The dumpster has two hollow arms 10 to receive the forks of a forklift, enabling the dumpster to be transported to the actual job site to replenish the applicator with flooring material. These arms are relatively long, to allow the dumpster to be extended out over the hopper 12 of the applicator from the front of the applicator (i.e. from the side where the flooring material 14 has not yet been deposited on the subfloor).

The two arms 10 are mounted on a bracket 201 to which is mounted an upwardly extending post 203. The post 203 is pivotally connected to the dumpster at bracket 205 and at struts 207. The dumpster 2 is thus able to pivot about the carrying arms 10 so that the dumpster can discharge to a position at an angle from the line of travel of the forklift. Flange 210 extending from post 203 and bracket 205 each have matching slots 211 which enable the dumpster to be locked at several different angles by means of lock plate 213. Lock plate 213 is mounted to bracket 205 so as to be pivoted downward and insert into slots 211.

As seen in FIGS. 1 and 2, the dumpster 2 has an openable bottom, in the form of a releasable bottom plate 16, releasable via either one of the handles 18 so that the flooring material can be dumped out the bottom of the dumpster once it is positioned above the hopper 12 of the applicator. The forklift (not shown) is used to raise the dumpster to position it above the hopper of the applicator, to the position shown in FIG. 2. The handles 18 are pivotally connected to the dumpster at pivot pins 20, and are ganged together via a transfer rod 21. A "dog leg" linkage 22 is connected to the handle 18 on each side. The linkages 22 are also pivotally connected to the bottom plate 16. When a handle 18 is rotated upward by pivoting about pin 20, the linkages 22 jackknife to allow the bottom plate 16 to swing open about the hinge 28 under the effect of the load of material in the dumpster. The counterweight 30 prevents the opening from being too violent.

When the bottom plate of the dumpster 2 is open, the counterweight contacts the front panel 32 of the dumpster at position such that the angle of the bottom plate corresponds approximately to the angle of the front panel 34 of the hopper 12 of the applicator. When the dumpster is empty, the counterweight balances the bottom plate back to the closed position. The dumpster design provides a flat bottom plate, so that the dumpster can sit directly on the floor for loading from the mixer. Its capacity is thus maximized, without needing to have a high mixer height. The height of the rear panel 36 of the dumpster positions it slightly below the discharge height from the mixer.

The applicator 40 is illustrated generally in FIGS. 2, 3, 5 and 13 and includes the following main components:

a. a chassis 42, having three wheels with separate hydraulic motors, namely two fixed rear wheel 44 and a pivotable front wheel 46;
b. a dispensing hopper 12 cantilevered off the rear end of the chassis;
c. an operator's platform 48 cantilevered off the front of the chassis; and
d. a steering wheel 50 connected to the front wheel.

Figure 4:
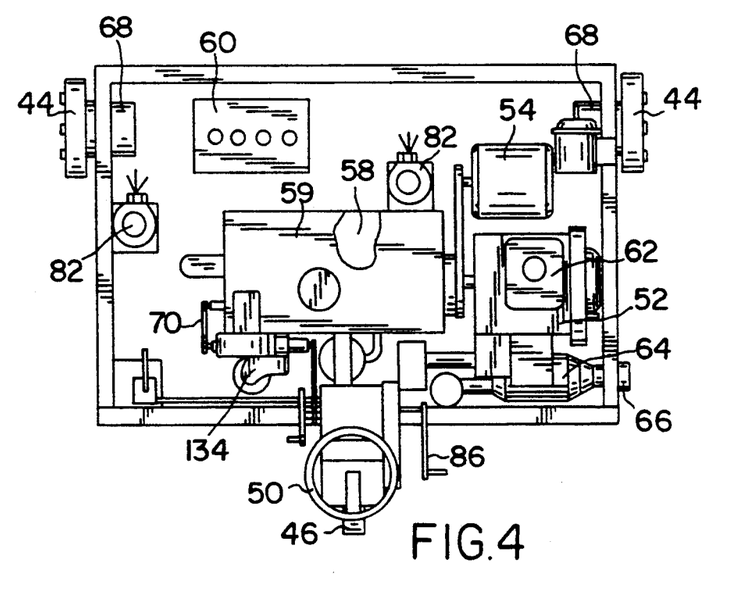
FIG. 4 is a plan view of the applicator chassis.

A gasoline engine 52, equipped with an alternator 54 to provide power to accessory equipment, is connected via a centrifugal clutch (not shown) to a variable displacement hydraulic pump 58, located under a hydraulic fluid reservoir 59. A 12-volt battery 60 is also provided, and of course there is also a gas tank 62. There is also a muffler (not shown) and a catalytic converter 64 connected to the engine exhaust, leading to a downwardly-directed exhaust port 66.

The positive-displacement hydraulic pump provides a volume of hydraulic fluid to the three positive-displacement hydraulic motors 68, one on each wheel. The motors are connected to the hydraulic pump in series, from one rear wheel to the other rear wheel to the front wheel, and thence back to the return. This ensures that the same volume of fluid passes through each motor, thus ensuring that each wheel normally rotates at the same speed regardless of the torque requirement. The exception is during turns, as will be described below. The hydraulic motors produce low speed, high torque and hence good control. The speed of the applicator is adjusted via the speed control 70, which adjusts the volume delivery from the hydraulic pump by adjusting the angle of the swashplate. A forward and reverse control is also provided, in the form of a shift lever 86 connected to a spool valve (not shown) which reverses the direction of hydraulic fluid flow through the motors.

Figure 3:
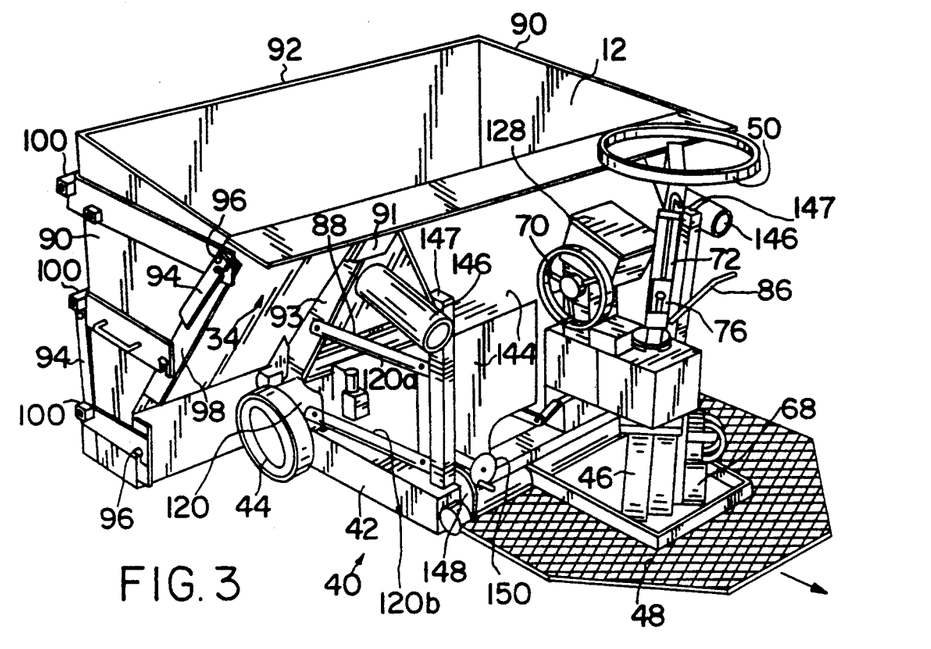
FIG. 3 is a perspective showing the applicator.

The front wheel 46 is connected via the collapsible steering column 72 to a steering wheel 50. The steering column folds down via a hinge 74, simply so that it and the controls are protected from damage during the loading of the hopper from the forklift-carried dumpster. A retractable bar 76 unlocks the steering column from its upright position, so that it can be folded out of the way during loading of the hopper from the dumpster.

Figure 12:
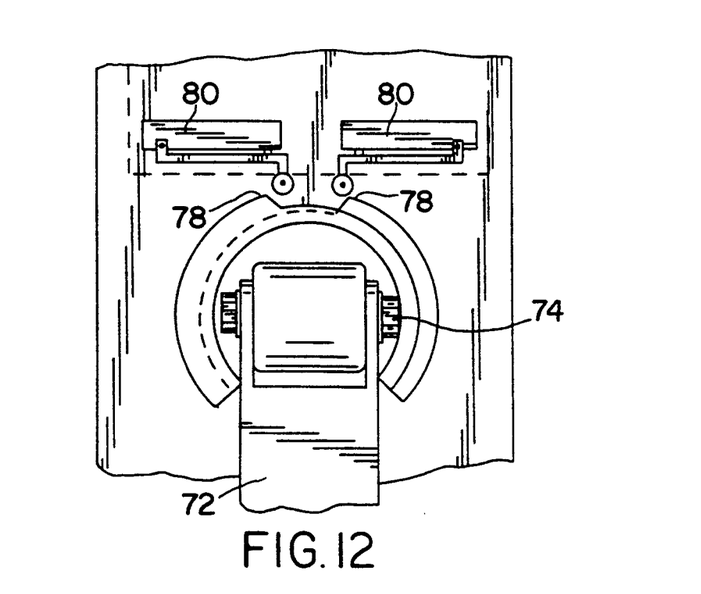
FIG. 12 is a plan view of the area at the base of the steering column.
Figure 13:
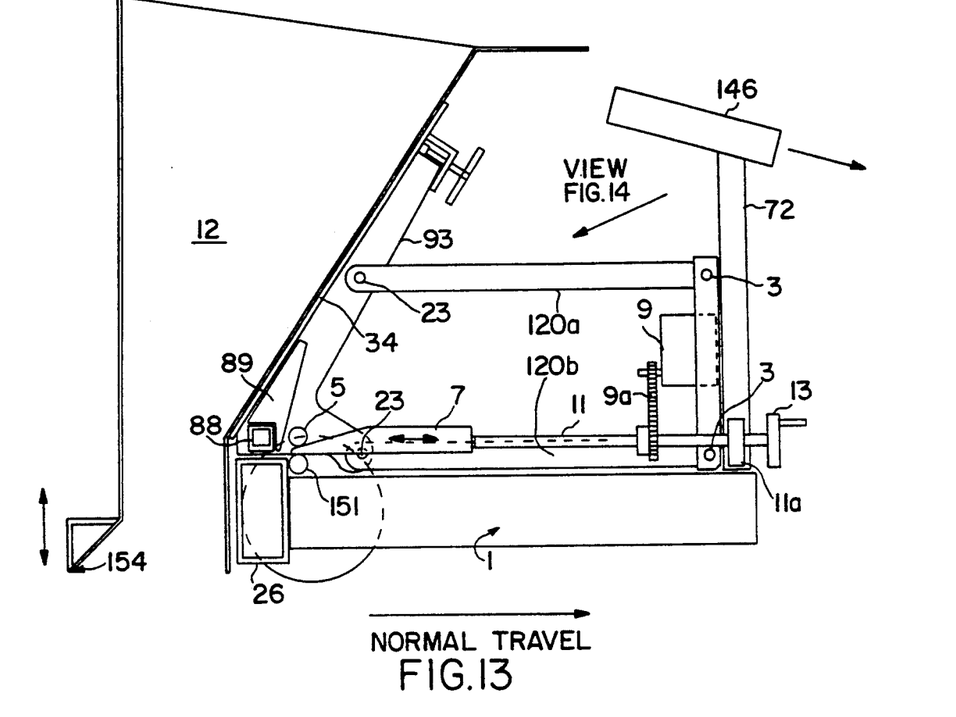
FIG. 13 is a side sectional view of the applicator.

At the base of the steering column are two cams 78. One cam activates a microswitch 80 when the front wheel is turned more than about 5 degrees to the right, and the other activates a corresponding microswitch when the front wheel is turned more than about five degrees to the left. The microswitches activate respective solenoids 82 which operate respective conventional hydraulic fluid bypass valves (not shown), so that hydraulic fluid is bypassed around the hydraulic motor on the wheel on the inside of the turn. This of course makes for a much smoother turn.

Figures 8, 9, 10:
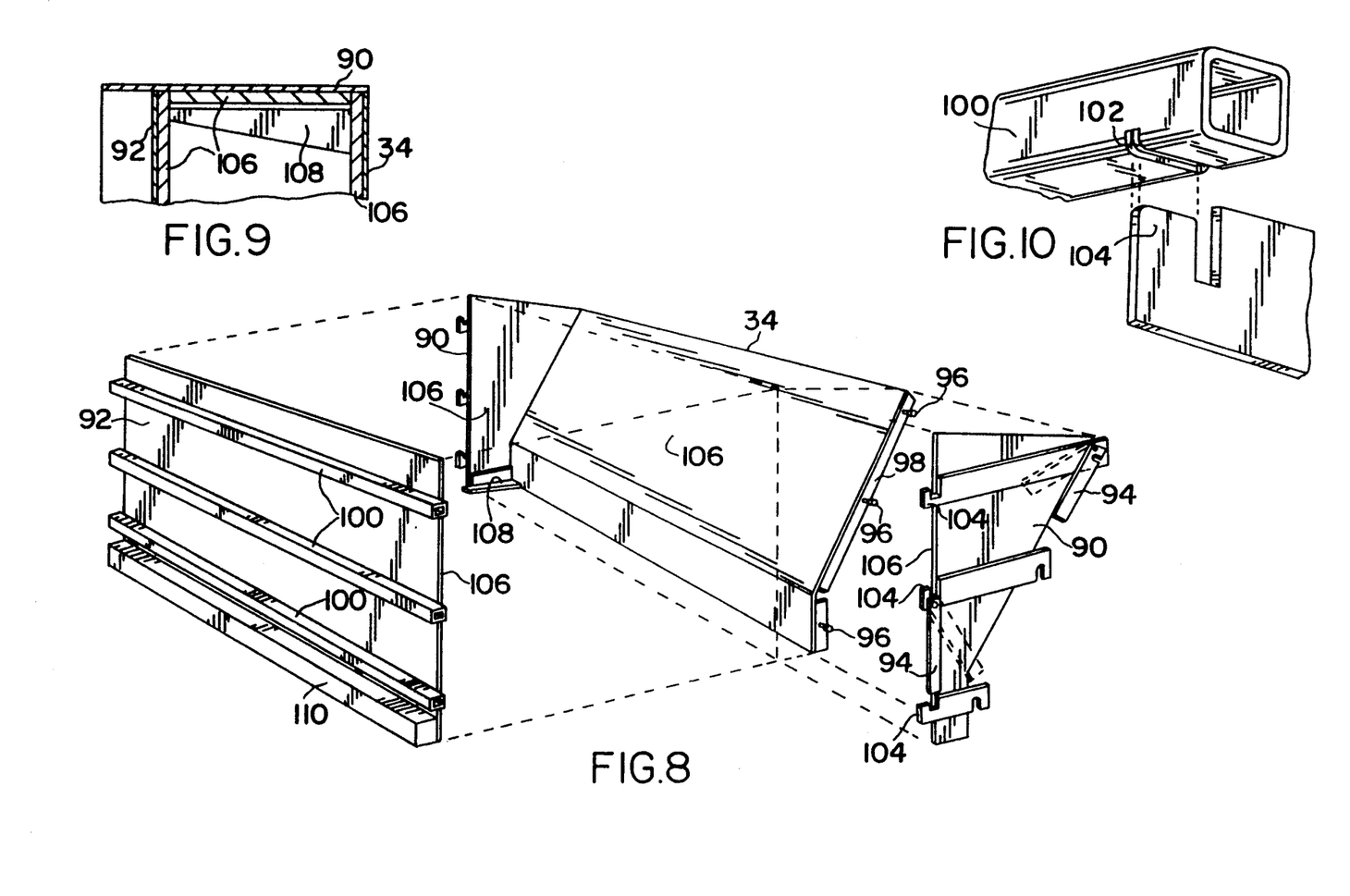
FIG. 8 is an exploded perspective showing the hopper construction.
FIG. 9 is a plan view at one end of the hopper.
FIG. 10 is a perspective showing the hopper side panel to rear panel attachment means.

The hopper 12 is supported off the rear end of the chassis, and consists of four separate panels which latch together but which are easily dismantleable for cleaning. The front panel 34 latches onto the main support crossbar 88 at the rear of the chassis, by virtue of hooks 89 which hook over the crossbar, and flanges 91 which hook over the top of the hopper bracket 93 which projects upwardly from the crossbar 88. Two side panels 90 latch onto the front panel, and the rear panel 92 latches onto the two side panels. Latches 94 are provided to lock the panels together securely thus holding the hopper precisely at its set level for proper screeding of the flooring material.

The side panels latch onto the front panel by virtue of three bolts 96 projecting outwardly from flanges 98 projecting at right angles from the ends of the front panel. The rear panel has three reinforcing square tube members 100 which have notches 102 to fit into three corresponding latches 104 provided at the rear edge of the side panels. The panels all preferably have plastic liners 106, mainly to eliminate sticking, thereby ensuring smooth material flow, and facilitating cleanup. The liners can of course be replaced periodically. At the bottom of the side panels 90 are horizontal 10 deflectors 108, which serve to reduce the amount of material deposited from the outside edge of the hopper, thus minimizing or eliminating ridging.

Figure 5:
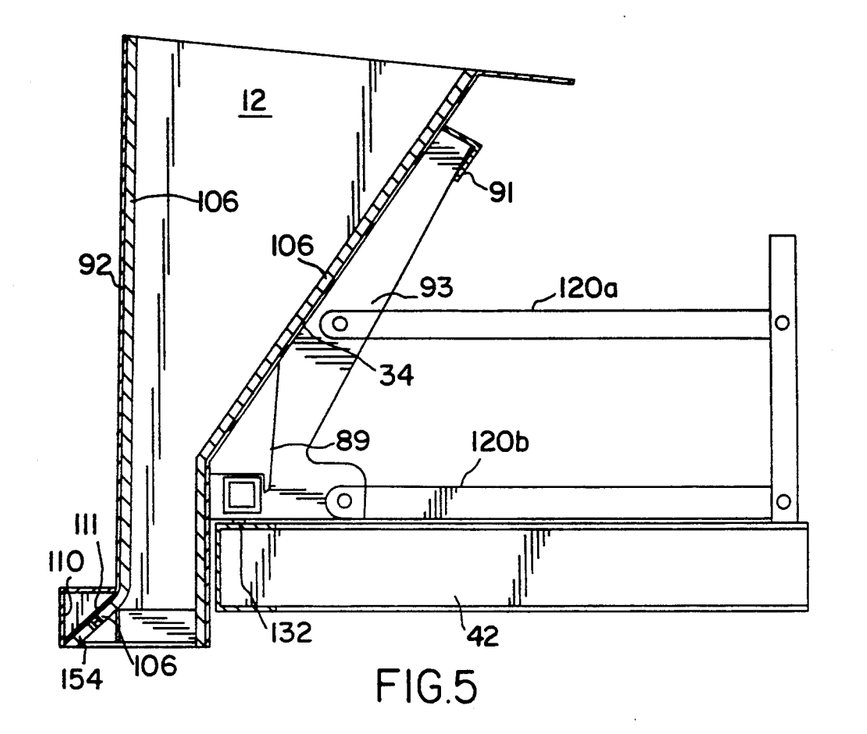
FIG. 5 is a cross-sectional elevation of the hopper and chassis.
Figure 6:
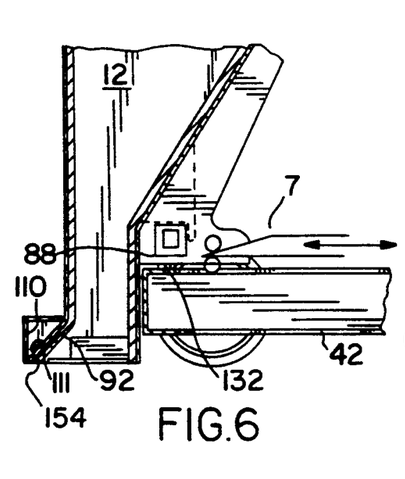
FIGS. 6 and 7 are similar views to FIG. 5, showing the hopper raising and lowering mechanism.
Figure 7:
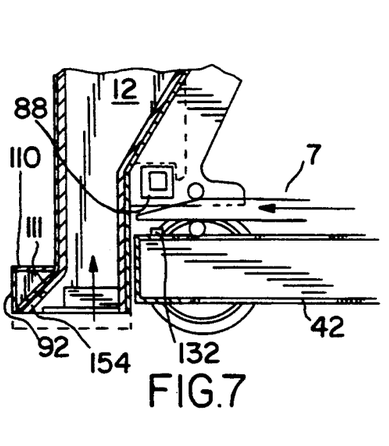

The rear panel includes a lower reinforcing angle cross member 110 which is fabricated with an equal length flat bar 111 welded into the hypotenuse position of the angle. This assembly provides the framework onto which the plastic liner 106 over the rear panel 92 is contoured, as seen in FIGS. 5, 6 and 7. The bottom edge of the liner acts as the screeding blade 154. This overall assembly provides the rigidity essential to the featured accuracy of the screeding action. The screeding blade being drawn over the deposited flooring material, at approximately a 45 degree raking angle, compacts the material and provides a flat and even distribution.

The height above the floor of the dispensing hopper's bottom opening is separately adjustable on each side. Referring to FIGS. 2, 3, 5, and 13, the axis of travel of the applicator is toward the front. A pair of upper and lower pivot arms 120a and 120b are pivotally connected by means of bearings 23 to each hopper bracket 93 so as to be pivotable in a vertical plane parallel to the applicator's axis of travel. Each pair of pivot arms 120a and 120b is similarly pivotably connected by means of bearings 3 to a post 145 located on each side of the chassis frame. The arms 120a and 120b remain parallel as the hopper bracket 93 to which they are connected is pivoted up and down. As described above, the dispensing hopper is mounted on the hopper brackets 93 each of which are connected to the crossbar 88. Thus the height of each side of the dispensing hopper above the floor is controlled by the degree of vertical pivoting of an upper and lower pivot arm pair. The upper pivot arms 120a serve to prevent the dispensing hopper from rocking backward by pivoting about its lower pivot arm connection.

The pivoting of the pivot arms 120a and 120b on each side of the hopper is adjusted and maintained by a wedge-shaped cam 7 which inserts between a pair of roller-type upper and lower cam followers. Upper cam follower 5 is mounted on the hopper bracket 93 while lower cam follower 151 is mounted on the chassis frame 1. The cam 7 acts as a ramp which as it is moved axially raises the upper cam follower 5 so that the upper bracket 93 and pivot arms 120a–b are pivoted upward.

Extending axially from the cam 7 toward the front of the applicator is adjusting shaft 11 rotatably mounted within a bearing 11a fixed to the chassis frame. The shaft 11 has a threaded end portion which inserts into a correspondingly threaded hole of cam 7. Since cam 7 is prevented from rotating by virtue of its engagement between upper and lower cam followers 5 and 151, rotation of the adjusting shaft 11 causes axial movement of the cam 7 and hence vertical pivoting of the pivot arms 120a–b.

The rotation shaft 11 may be effected either by handwheel 13 or by a motor driven servomechanism 9 coupled to the shaft 11 by means of gears 9a. Adjusting shaft 11 thus serves as a means for adjusting and maintaining the height of each side of the dispensing hopper 12 above the floor. The height adjustment corresponding to one rotation of the adjusting shafts is determined by the pitch of the threaded end portion of the shaft 11 and slope of the cam 7. By selecting these parameters appropriately, the height adjustment may be made as coarse or fine as the user desires.

Figure 14:
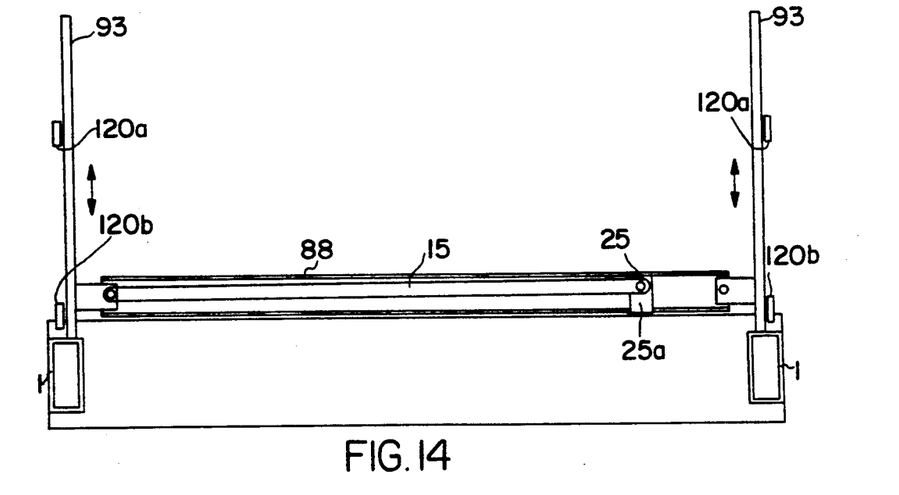
FIG. 14 is a rear sectional view of the applicator.

Next, in FIG. 14 there is shown a sectional view of the rear of the applicator showing the crossbar 88 in detail. Crossbar 88 is pivotably connected at each end to a hopper support bracket 93 so as to be pivotable in a transverse plane. The pivoting of the crossbar 88 with respect to the brackets 93 facilitates the separate height adjustment of each side of the dispensing hopper 12. Crossbar 88 is a tube with a square cross-section inside of which is a radius arm 15 which is also transversely pivotably connected at one end to one of the support brackets 93. The other end of the radius arm 15 is transversely pivotably mounted to a tab 25 extending from the chassis frame into an opening 25a in the midportion of the crossbar 88. The radius arm 15 serves to stabilize the dispensing hopper 12 against laterally directed forces which may develop at the screed blade and be transmitted through the dispensing hopper to the crossbar 88 and support brackets 93.

During operation of the apparatus, it is convenient for the screed blade to be able to be lifted off of the floor in order to clear obstacles. For this purpose, two hydraulic cylinders (not shown) may be provided mounted on the chassis with one under each end of the cross bar 88. Actuation of the cylinders allows the screed to be lifted to a desired height without losing the operating setting of the screed blade height as determined by the position of cam 7.

Figure 11:
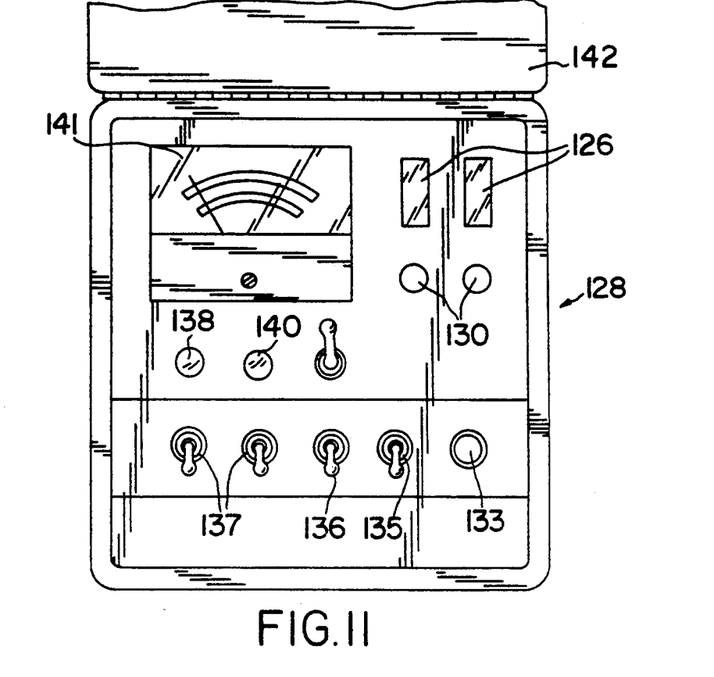
FIG. 11 is a view of the control panel.

A height display 126 on the control panel 128, calibrated via knobs 130 to the height of the hopper above the floor, shows the deposited layer thickness. Transducers 132 between the chassis and the main crossbar provide the input.

In addition to the height display, the control panel 128 includes various switches and gauges, as follows:
a. a horn button 133, connected to a horn 134;
b. a start/stop switch 135;
c. a run/idle switch 136 for activating a solenoid which pulls the throttle to a preset position.
d. two switches 137 for left and right pointers 146 which are focused narrow beam lights positioned on either side of the chassis and aimed along the line of travel to assist the operator in maintaining the alignment of the applicator. Locking handles 147 are provided to lock the pointers where desired.
e. a green light 138 indicating that the controls 5 are energized and that the hour meter (not shown) is running;
f. a red alternator light 140;
g. a thermometer gauge 141, indicating that the catalytic converter 64 is up to proper operating temperature.

A plastic cover 142 is provided to protect the panel, especially during loading of the hopper from the dumpster. There is also a chassis guard or shield 144 which simply latches on to protect the various components mounted on the chassis from accidental spillage.

The operator's platform is cantilevered from the front of the chassis, by virtue of hooks 148 which hook over tab 25 the front frame member 150. The operator stands on the platform facing rearwardly, i.e. towards the hopper.

The hopper 12 can obviously be built in any desirable and reasonably workable width. In the preferred embodiment, two separate widths have been tested, namely 4 feet and 5 feet. These widths are convenient, since jobs often involve either 10 foot or 12 foot wide corridors, and it is desirable to have a hopper width which evenly divides into the corridor width. It is an advantage of the preferred embodiment that the same chassis can be used to support various widths of hoppers, so that the hoppers can be readily interchanged to suit the job. Obviously, the invention can be readily adapted to any suitable and practical width of hopper.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. An applicator for applying seamless flooring material, comprising:
   a steerable chassis having first and second opposite, laterally extending sides and a rear, said chassis being mounted on wheels;
   a first lower pivot arm mounted on the first side of the chassis extending rearwardly and pivotable vertically and a second lower pivot arm mounted on the second side of the chassis extending rearwardly and pivotable vertically;

a crossbar at the rear of the chassis extending transversely from the first side of the chassis to the second side;

a first hopper bracket projecting upwardly from the crossbar at the first side of the chassis and being pivotally connected to the first lower pivot arm and a second bracket projecting upwardly from the crossbar at the second side of the chassis and being pivotally connected to the second lower pivot arm;

a dispensing hopper mounted on the hopper brackets and the crossbar so as to be cantilevered at the rear of the chassis and pivotable vertically, the dispensing hopper having an opening at its bottom for dispensing flooring material; and a screed blade mounted on said hopper adjacent said dispenser hopper opening for distributing flooring material;

wherein the degree of vertical pivoting of the first lower pivot arm controls the height above the floor of the dispensing hopper opening and the screed blade at the first side of the chassis, and the second lower pivot arm controls the height above the floor of the dispensing hopper opening and the screed blade at the second side of the chassis.

2. The applicator as set forth in claim 1 further comprising an upper pivot arm on each side of the chassis above each lower pivot arm with each upper pivot arm being pivotably connected to the chassis and the hopper bracket on that side, the upper pivot arms remaining parallel to the lower pivot arms as the height of the dispensing hopper is adjusted so as to prevent the dispensing hopper from rocking backward by pivoting about the pivotable connection between the hopper bracket and the lower pivot arm.

3. The applicator as set forth in claim 1 wherein the first hopper bracket is pivotally connected to the crossbar at the first side of the chassis, and the second hopper bracket is pivotally connected to the crossbar at the second side of the chassis, so each bracket is independently pivotable in a transverse plane.

4. The applicator as set forth in claim 3 further comprising a radius arm within the crossbar pivotably connected to one of the hopper brackets so as to pivot with the crossbar and pivotably connected to the chassis through an opening in a midportion of the crossbar, the radius arm serving to stabilize the hopper against laterally directed forces developing at the screed blade.

5. The applicator as set forth in claim 1 further comprising:

a wedge shaped cam on each side of the chassis extending rearwardly, the axial position of each cam being adjustable; and upper cam followers mounted on each hopper bracket with lower cam followers mounted immediately below on each side of the chassis in a manner such that the wedge-shaped cams engage between the upper and lower cam followers so that the height of the dispensing hopper above the floor on each side is adjusted and maintained by the axial positioning of the wedge-shaped cams.

6. The applicator as set forth in claim 5 wherein the axial position of each wedge-shaped cam relative to said upper and lower cam followers is adjusted by an adjusting shaft having one end threaded into said wedge-shaped cam and another end rotatably mounted within a bearing mounted on the chassis so that rotation of the shaft causes axial movement of the wedge-shaped cam.

7. An applicator as recited in claim 1, further comprising propulsion means in which a hydraulic pump pumps fluid in series through hydraulic motors on the wheels.

8. An applicator as set forth in claim 7, further comprising a sensing means for sensing when a front wheel turns greater than a certain angle from a forward axis of travel, the sensing means being connected to a bypass valve means to bypass the hydraulic motor of the wheel on the side of the chassis toward which the front wheel is turned.

9. A seamless flooring material application system, comprising the applicator of claim 1, in combination with a forklift liftable dumpster, top-fillable with flooring material from mixing apparatus and positionable above said dispensing hopper of the applicator, and bottom-openable to dump said flooring material into said applicator hopper.

10. The system as set forth in claim 9 wherein the dumpster further includes a pair of carrying arms into which may be inserted the tines of a forklift, the carrying arms being pivotably mounted to the dumpster enabling the dumpster to be pivoted laterally from the forklift's direction of travel.

* * * * *

UNITED STATES PATENT OFFICE
CERTIFICATE OF CORRECTION

Patent No. 5,292,040  Dated March 8, 1994

Inventor(s) Alan M. McKim

It is certified that error appears in the above-identified patent and that said Letters Patent is hereby corrected as shown below:

Col. 4, line 27 please delete "[bracket]" and add --brackets--.

Col. 5, line 6 after "93" add --,--.

Col. 6, line 35 delete [tab].

Signed and Sealed this

Seventh Day of March, 1995

Attest:

BRUCE LEHMAN

Attesting Officer    Commissioner of Patents and Trademarks